(12) United States Patent
Robinson (10) Patent No.: US 9,328,931 B2
(45) Date of Patent: May 3, 2016

(54) HEATING AND/OR COOLING SYSTEM FOR MAINTAINING AN ENVIRONMENT AT A DESIRED TEMPERATURE

(75) Inventor: Anthony Robinson, St. Ives (GB)

(73) Assignee: ESG POOL VENTILATION LTD, Cambridgeshire (GB)

( * ) Notice: Subject to any disclaimer, the term of this patent is extended or adjusted under 35 U.S.C. 154(b) by 0 days.

(21) Appl. No.: 13/984,777

(22) PCT Filed: Feb. 9, 2012

(86) PCT No.: PCT/GB2012/050290
§ 371 (c)(1),
(2), (4) Date: Oct. 18, 2013

(87) PCT Pub. No.: WO2012/107770
PCT Pub. Date: Aug. 16, 2012

(65) Prior Publication Data
US 2014/0034285 A1    Feb. 6, 2014

(30) Foreign Application Priority Data

Feb. 11, 2011   (GB) .................................. 1102473.4
Mar. 22, 2011   (GB) .................................. 1104820.4

(51) Int. Cl.
*F25B 41/04*   (2006.01)
*F24D 11/02*   (2006.01)
(Continued)

(52) U.S. Cl.
CPC ................ *F24D 11/02* (2013.01); *E04H 4/129* (2013.01); *F24D 11/0214* (2013.01); *F24D 19/10* (2013.01); *F24D 19/1039* (2013.01);
(Continued)

(58) Field of Classification Search
CPC . F24D 11/02; F24D 11/0214; F24D 19/1039; F24D 19/10; F25D 25/005; F25D 30/02; F25D 2700/1933; F25D 2700/2115; E04H 4/129; Y02B 30/126
USPC ..................................................... 62/222, 223
See application file for complete search history.

(56) References Cited

U.S. PATENT DOCUMENTS 4,207,751 A  *  6/1980   Kampfenkel et al. .......... 62/222
4,257,795 A  *  3/1981   Shaw ...................... F25B 1/047
                                                              62/150

(Continued)

FOREIGN PATENT DOCUMENTS

CA         1227049 A       11/2009
CN       201351998 Y       11/2009
(Continued)

*Primary Examiner* — Ljiljana Ciric
(74) *Attorney, Agent, or Firm* — David W. Carstens; Jeffrey G. Degenfelder; Carstens & Cahoon, LLP (57) ABSTRACT

A heating and/or cooling system for maintaining an environment at a desired temperature. The heating and/or cooling system includes a heat pump, a temperature sensor disposed to measure a temperature of the environment, and a system controller. The system controller may be configured to control a condensing temperature within the condenser such that the condensing temperature is set as low as possible while maintaining the condensing temperature a predetermined amount above the desired temperature that is being maintained. The system controller may also be configured to control the evaporating valve in order to vary, based on the measured temperature, an evaporating temperature in order to reduce the difference between the evaporating and condensing temperatures.

17 Claims, 3 Drawing Sheets

(51) Int. Cl.
*E04H 4/12* (2006.01)
*F25B 25/00* (2006.01)
*F25B 30/02* (2006.01)
*F24D 19/10* (2006.01)

(52) U.S. Cl.
CPC .............. *F25B25/005* (2013.01); *F25B 30/02* (2013.01); *F25B 2700/1933* (2013.01); *F25B 2700/21151* (2013.01); *Y02B 30/126* (2013.01)

(56) References Cited

U.S. PATENT DOCUMENTS

| | | | |
|---|---|---|---|
| 4,346,755 A | 8/1982 | Alley et al. | |
| 4,353,409 A | 10/1982 | Saunders et al. | |
| 4,429,547 A | 2/1984 | Granryd | |
| 4,517,812 A * | 5/1985 | Umezu | F25B 13/00 62/228.5 |
| 4,569,207 A | 2/1986 | James | |
| 4,645,908 A * | 2/1987 | Jones | 392/340 |
| 4,685,309 A * | 8/1987 | Behr | 62/223 |
| 4,909,041 A * | 3/1990 | Jones | F24D 11/0214 62/157 |
| 5,142,879 A * | 9/1992 | Nakamura | F24F 3/065 62/160 |
| 5,701,753 A * | 12/1997 | Iritani | 62/222 |
| 5,735,134 A * | 4/1998 | Liu | F25B 49/02 62/183 |
| 6,499,308 B2 * | 12/2002 | Inoue | F25B 13/00 62/228.3 |
| 6,574,977 B2 * | 6/2003 | Ozaki et al. | 62/222 |
| 6,883,345 B2 * | 4/2005 | Lee | F25B 13/00 62/324.6 |
| 7,178,353 B2 * | 2/2007 | Cowans et al. | 62/222 |
| 7,984,620 B2 * | 7/2011 | Shimamoto | F24F 3/065 62/324.1 |
| 8,769,974 B2 * | 7/2014 | Honda | 62/222 |
| 8,950,202 B2 * | 2/2015 | Honda | 62/255 |
| 8,984,901 B2 * | 3/2015 | Honda | 62/160 |
| 2004/0261441 A1 | 12/2004 | Turner et al. | |
| 2008/0245087 A1 * | 10/2008 | Orcutt | F25B 6/04 62/238.7 |
| 2009/0241569 A1 * | 10/2009 | Okada | F25B 40/00 62/196.1 |
| 2010/0324742 A1 * | 12/2010 | Huerta-Ochoa | F25B 41/062 700/282 |
| 2011/0072840 A1 * | 3/2011 | Itagaki et al. | 62/222 |
| 2012/0036873 A1 * | 2/2012 | Bush | F24F 1/06 62/81 |
| 2012/0210736 A1 * | 8/2012 | Rockenfeller | F25B 7/00 62/115 |
| 2012/0260679 A1 * | 10/2012 | Huerta-Ochoa | F25B 41/062 62/222 |
| 2013/0312442 A1 * | 11/2013 | Suzuki et al. | 62/222 |

FOREIGN PATENT DOCUMENTS

| | | |
|---|---|---|
| CN | 101639288 A | 2/2010 |
| EP | 0053953 A2 | 6/1982 |
| EP | 0962715 A2 | 8/1999 |
| EP | 1650508 A | 4/2006 |
| EP | 1972858 A2 | 9/2008 |
| EP | 1972871 A2 | 9/2008 |
| EP | 2103884 A1 | 9/2009 |
| EP | 2109890 A1 | 9/2009 |
| EP | 2119985 A2 | 11/2009 |
| GB | 1516379 A | 7/1978 |
| GB | 2024392 A | 1/1980 |
| GR | 2003100522 A | 8/2005 |
| JP | 11248284 A | 9/1999 |
| JP | 2005147550 A | 6/2005 |
| JP | 2007155299 A | 6/2007 |
| JP | 200825945 A | 2/2008 |
| JP | 201085092 A | 4/2010 |
| WO | WO2005103586 A | 11/2005 |

\* cited by examiner

HEATING AND/OR COOLING SYSTEM FOR MAINTAINING AN ENVIRONMENT AT A DESIRED TEMPERATURE

CROSS REFERENCE TO RELATED APPLICATIONS

This application is the U.S. national phase of International Application No. PCT/GB2012/050290 filed Feb. 9, 2012, which designated the U.S. and claims priority to G.B. application numbers GB 1104820.4 filed Mar. 22, 2011, and GB 1102473.4 filed Feb. 11, 2011, the entire contents of each of which are hereby incorporated by reference.

FIELD OF THE INVENTION

This invention relates to a heating and/or cooling system and related methods. In particular, but not exclusively, the heating and/or cooling system is a building beating and/or cooling system which may typically be arranged to heat and/or cool all types of buildings, swimming pools, vehicles and also the water of swimming pools, all of which may be outside.

BACKGROUND OF THE INVENTION

In the present world order, there is an ever increasing desire to increase the efficiency of systems in order to reduce their energy consumption. Heating systems are no exception to this rule and indeed, since such heating systems tend to consume large amounts of energy, there may be a particular desire to increase the efficiency of such systems.

It is known to use heat pumps operating a thermodynamic cycle in order to heat and/or cool environments, such as a building or the like. Such systems are advantageous in two respects. One, they can provide both heating within the system and systems typically include valves to allow reversing from heating or visa versa to occur. Two, they use energy input to the system to move heat energy from a heat source to a heat sink, or visa versa, where the energy moved can be greater, perhaps substantially, than the energy input to the system.

SUMMARY OF THE INVENTION

According to a first aspect there is provided a heating and/or cooling system including at least one of the following:
  a heat pump having a compressor, a condenser, an evaporator, and an expansion control means each connected by a refrigerant pipe work system;
  a heating pipe work system arranged to circulate a medium through a condenser of a refrigerant pipe work system thereby exchanging heat between refrigerant within the refrigerant pipe work system and the medium within the heating pipe work system;
  a heat emitter arranged to emit heat from a medium;
  a temperature sensor arranged to monitor the temperature of the environment in which an evaporator/condenser is operated to extract heat and the temperature sensor being arranged to generate a temperature output;
  a system controller arranged to have input thereto a temperature output from a temperature sensor and further arranged to control the rate of flow of a medium through the condenser and to control an expansion means to vary the temperature at which the fluid within a refrigerant pipe work system evaporates in response to the temperature output.

Typically, the medium flowing through the heating system is a heating medium.

In a cooling system the positions of the condenser and the evaporator are reversed and the medium flowing in the heating system may then be thought of as a cooling medium. However, the skilled person will appreciate that the refrigerant pipe work system is a mechanism for moving heat in either a cooling or heating system.

In a system that is reversible between a heating and a cooling system then the system may have modifications to the refrigerant pipe work system but the skilled person will appreciate how to do this.

Generally, the system controller is arranged to control the rate of flow of the medium in the heating pipe work system to control the temperature at which the fluid within the refrigerant pipe work system condenses within the condenser (ie the condensing temperature).

In particular, the system controller may be arranged to vary the condensing temperature according to the temperature output of the temperature sensor.

That is, the system controller may be arranged to vary, from time to time, the condensing temperature in response to the temperature output of the temperature sensor. From time to time may be in real-time, or in substantially real time, or it may mean periodically. The period between variations may be for example, substantially any of the following: 10 seconds; 20 seconds; 30 seconds; 45 seconds; 1 minutes; 2 minutes; 5 minutes; 10 minutes; 30 minutes or the like.

Typically, the evaporator is arranged to extract heat from the outside air and as such the temperature sensor may be arranged to measure outside air temperature. Such a system would typically be referred to as an air source heat pump.

In alternative or additional embodiments, the evaporator may be arranged to use heat held within the ground and as such be referred to as a ground source heat pump. In such an embodiment, the temperature sensor may be arranged to measure the temperature of the ground. The skilled person will appreciate that the possible fluctuation in air temperature is likely to be greater than the possible fluctuation in ground temperature. As such, the invention may find more utility with as an air source heat pump but this does not mean that it will not find utility with other sources of heat.

Generally, the system controller is arranged to control the evaporator in order to control the evaporating temperature (ie the temperature at which liquid within the refrigerant pipe work system changes to a gas). The skilled person will appreciate that this is achieved by controlling the pressure at under which the evaporation occurs.

In particular, the system controller may be arranged to vary the evaporating temperature according to the temperature output of the temperature sensor.

That is, the system controller may be arranged to vary, from time to time, the evaporating temperature in response to the temperature output of the temperature sensor. From time to time may be in real-time, or in substantially real time, or it may mean periodically. The period between variations may be for example, substantially any of the following: 10 seconds; 20 seconds; 30 seconds; 45 seconds; 1 minute; 2 minutes; 5 minutes; 10 minutes; 30 minutes or the like.

The system controller may be arranged to vary the evaporating and condensing temperatures using the same period.

Typically, the system controller is arranged to maintain the condensing temperature as low as possible. In this context, as low as possible may mean at least one of the following:

i. low enough to ensure that complete condensation of the gas to a liquid occurs within the condenser;

ii. a predetermined amount above a temperature that the heating system is maintaining, thereby allowing for heat exchange losses; and iii. leaving sufficient margin above the temperature the heating system is maintaining to ensure that complete condensation of the gas to a liquid occurs within the condenser.

The predetermined amount that the condensing temperature is held above the temperature that the heating system is maintaining may be substantially any of the following: 3° C., 4° C., 5° C., 6° C., 7° C., 8° C., 9° C., 10° C., 11° C., 12° C. or more.

Further, the system controller is arranged to maintain the evaporating temperature as high as possible. In this context, as high as possible may mean at least one of the following:

i. as close to the temperature of environment in which the temperature sensor is provided whilst allowing complete evaporation of the liquid entering the evaporator; and ii. a predetermined amount below the temperature of the environment in which the temperature sensor is provided, thereby allowing for heat exchange losses.

The predetermined amount that the evaporating temperature is held below the temperature of the environment may be substantially any of the following: 3° C., 4° C., 5° C., 6° C., 7° C., 8° C., 9° C., 10° C., 11° C., 12° C. or more.

That is, the system controller may be arranged to reduce the gap between the condensing and evaporating temperature whilst allowing the heat pump to operate.

The condenser may comprise a heat exchanger arranged to extract heat from the refrigerant within the refrigerant pipe work system.

The evaporator may comprise a heat exchanger arranged to transfer heat to the medium within the heating pipe work system.

The heating pipe work system may comprise a heat exchanger arranged to transfer heat from the medium within the heating pipe work system to the area to be heated, typically the inside of a building or the like; or may be to heat water within a swimming pool.

The heating pipe work system may comprise a pump arranged to pump medium around the heating pipe work system. The pump may be of variable speed thereby allowing control of the condensing temperature.

The heating pipe work system may comprise a by-pass pipe arranged to allow medium (ie a fluid) to by-pass the heating exchanger of the heating pipe work system. The heating pipe work system may also comprise a valve arranged to control the amount of medium allowed to flow through the by-pass pipe.

In some embodiments, the heating pipe work system may be arranged to heat a swimming pool. In such embodiments, the water within the swimming pool may be circulated through a heat exchanger forming part of the refrigerant pipe work system. In other embodiments, a further heat exchanger may be provided in order to move heat from the heating pipe work system to water within the swimming pool.

The system controller may be further arranged to control the rate of flow of the medium within the heating pipe work system through the condenser as a function of variables in addition to the temperature output. For example, these variables may include any one or more of the following: the thermal characteristics of a building heated by the heating system; the temperature characteristics a heat exchanger associated with the medium within the heating pipe work system.

Embodiments of the invention may be arranged to control the expansion means as a function of a variable in addition to the temperature output. For example, these variables may include the characteristics of a heat exchanger associated with the evaporator.

According to a second aspect of the invention there is provided a method of increasing the efficiency of a heat pump having an evaporator, a compressor, a condenser and an expansion control means each connected by a refrigerant pipe work system including monitoring the temperature in which a evaporator is operating and using a system controller to vary, from time to time, the temperature at which gas condenses to a fluid within the condenser and also varying, from time to time, the temperature at which a liquid expands to a gas within the evaporator in order to reduce the difference between the evaporating and condensing temperatures.

Conveniently, the method may also take into account variations in the efficiency of the condenser and evaporator as the temperature at which they operate varies.

According to a third aspect of the invention there is provided a machine readable medium containing instructions which when read by a machine cause that computer to perform as the system of the first aspect of the invention or cause that machine to provide the method of the second aspect of the invention.

In any of the above aspects of the invention the machine readable medium may comprise any of the following: a floppy disk, a CD ROM, a DVD ROM/RAM (including a −R/−RW and +R/+RW), a hard drive, a solid state memory (including a USB memory key, an SD card, a removable flash memory card sold under the trademark MEMORY STICK®, a compact flash card, or the like), a tape, any other form of magneto optical storage, a transmitted signal (including an Internet download, an FTP transfer, etc), a wire, or any other suitable medium.

The skilled person will appreciate that a feature discussed in relation to one of the above aspects of the invention may be applied, mutatis mutandis, to the other of the aspects of the invention.

Reference to pipe work system herein may also be thought of as a reference to a pipe system.

BRIEF DESCRIPTION OF THE DRAWINGS

There now follows by way of example only a detailed description of embodiments of the present invention with reference to the accompanying drawings in which.

DETAILED DESCRIPTION OF THE DRAWINGS

Figure 1:
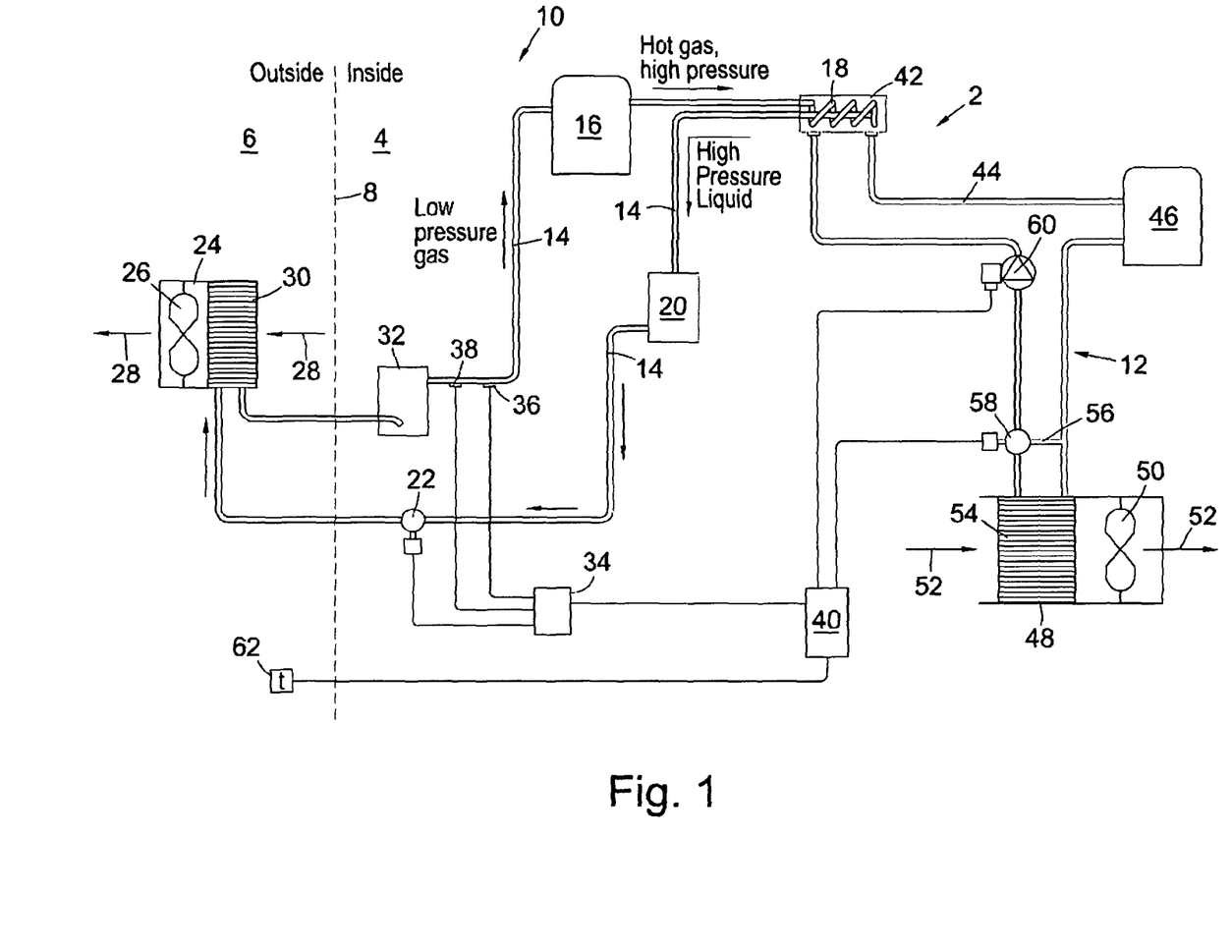
FIG. 1 is a schematic example of system according to an embodiment of the invention.

The system 2 shown in FIG. 1 provides a thermodynamic cycle to implement a heat pump which can either move heat from the inside 4 of a space (such as a building, vehicle interior, swimming pool, etc) to the outside 6 of that space or visa versa. The boundary between the inside 4 and the outside 6 is shown by the dotted line 8 which would typically be a building wall.

The system 2 comprises two fluid circuits 10, 12; the first 10 of which provides the thermodynamic cycle and the second of which 12 moves heat to or from the first fluid circuit 10 to the inside 4 of the space for the purpose of heating and/or cooling.

The skilled person will appreciate that the thermodynamic cycle can be run in either direction to move heat either from outside 6 to the inside 4 or visa versa. The arrangement shown in the Figures illustrates the system arranged to operate as a heating system. To operate as a cooling system then the condenser and evaporator are switched within the circuit. Indeed, the skilled person will appreciate that reversible systems are well known and readily achievable by minor modifications to the first fluid circuit 10.

The first fluid circuit 10 comprises a refrigerant pipe work system 14 (for the sake of clarity only some portions of the refrigerant pipe work system are labelled) which connects together a plurality of components. The connected components are a compressor 16 which performs mechanical work on the cooling fluid within the refrigerant pipe work system 14 and converts a low pressure, cool, gas to a high pressure hot gas.

The refrigerant pipe work system 14 conveys this hot gas, from the compressor 16, to a condenser 18 which condenses the fluid within the refrigerant pipe work system 14 to a high pressure, moderate temperature, liquid. The fluid within the refrigerant pipe work system 14 is then conveyed to a receiver 20. The receiver 20 is arranged to separate the condensed liquid from any remaining gas.

Next, the refrigerant pipe work system 14 conveys the fluid to an evaporating valve 22 (which may be thought of as an expansion control means) which lets the high pressure liquid expand into the evaporator 24 to a low pressure, cool, gas. In this embodiment, the evaporator 24 is air cooled (and thus the heat pump is typically referred to as an air source heat pump) but in other embodiments other cooling mechanisms might be used. For example, it is known to use ground source heat pumps which utilise ground heat as a source/sink. It would be possible to utilise water as a heat source.

In the embodiment being described, the evaporating valve 22 is electrically operated; ie it is an electric evaporating valve. However, in other embodiments, the valve may be actuated by other means such as hydraulics, pneumatics, magnetic, or the like.

However, in this embodiment, the evaporator 24 comprises a fan 26 which is arranged to draw air 28 through a heat exchanger 30 including a series of parallel plates mounted on tubes circulating the refrigerant. Again, the skilled person will appreciate that there are many other forms of heat exchanger which may also be applicable. The evaporator 24 draws heat from, in this case, the air 28 which. heats the fluid within the refrigerant pipe work system 14 and causes that fluid to become a cool vapour.

An accumulator 32 is provided within the first fluid circuit 10 and arranged to separate out any liquid that remains within the gas at that point in the refrigerant pipe work system 14 to prevent such liquid from damaging the compressor 16. The refrigerant pipe work system 14 conveys gas to the compressor 16 from the accumulator 32 thus completing the thermodynamic cycle and the first fluid circuit 10.

In order to control the first fluid circuit 10 and ensure that it is functioning correctly, a first fluid circuit controller 34 is provided. The first fluid circuit controller 34 may be referred to as an evaporating controller. The first fluid circuit controller 34 receives input data generated by both a temperature sensor 36 and a pressure sensor 38 each of which are connected to the refrigerant pipe work system 14 in a region of the output of the accumulator 32 (ie in the refrigerant pipe work system 14 between the accumulator 32 and the compressor 16. The first fluid circuit controller 34 also communicates to and from a system controller 40 (ie the first fluid circuit controller 34 makes outputs to and receives inputs from the system controller 40).

The first fluid circuit controller 34 is arranged to control the evaporating valve 22 by making outputs thereto. A closed loop system may be provided between the output of evaporating valve 22 and the first fluid circuit controller 34 by pressure sensor 38 and temperature sensor 36 such that feedback (ie input to the first fluid control circuit) is provided by the evaporator 24.

Thus, in operation, the first fluid circuit controller 34 monitors both the temperature (given by the temperature sensor 36) and the pressure (given by the pressure sensor 38) and controls the position of the evaporator 22 in order to maintain the temperature and pressure at a set point. In equilibrium conditions of evaporation there is only one temperature for a given pressure.

The second fluid circuit 12, typically a so-called Low Temperature Hot Water (LTHW) system comprises a heating pipe work system 44. This heating pipe work system itself comprises a non-storage heat exchanger 42 arranged to transfer heat given up by the condensing fluid within the condenser 18 thereby heating the fluid within the second fluid circuit 12. The fluid (water in a LTHW system) within the second fluid circuit may be thought of as a medium. The heating pipe work system may also be referred to as a second pipe work system 44 and carries the heated fluid to a reservoir 46. Embodiments having such a reservoir can be advantageous in that the reservoir can help to avoid over rapid starting and/or stopping of the compressor. The second pipe work system 44 may be thought of as a Low Temperature Hot Water (LTHW) pipe work system. In this embodiment the how water in the LTHW pipe work system provides a medium.

Fluid flows from the reservoir 46 to an air handling unit 48 arranged to heat the space (ie the inside 4); as such the air handling unit may be thought of as a heat emitter. The air handling unit 48 comprises a fan 50 arranged to draw air 52 through a heat exchanger 54 through which the fluid which has been heated in the heat exchanger 42 passes.

Fluid leaving the air handling unit 48 is returned, by the LTHW pipe work system of the second fluid circuit 12, to the heat exchanger 42 to take up more heat from the first fluid circuit 10 having dissipated the heat gained earlier through the air handling unit 48 to the space of the inside 4.

A by-pass pipe 56 is provided to allow fluid within the second fluid circuit 12 to bypass the air handling unit 48 thereby giving control of the amount of heat provided to the space of the inside 4; ie the room temperature. In order to control the amount of heat that flows through the bypass pipe 56 and thereby through the air handling unit 48 there is provided a motorised valve 58. The position of the motorised valve is controlled by the system controller 40 which is connected to a room thermostat (or other temperature sensor)—not shown.

Fluid is pumped around the second fluid circuit 12 by a LTHW variable speed pump 60 which is also controlled by the system controller 40.

Thus, the system controller 40 controls the pump 60 and the motorised valve 58 in order to control the temperature of the space (ie room). The amount of heat given out to the room from the fluid within the second fluid circuit will also affect the heat taken from the condenser 18 and as such will affect the temperature of the fluid within the first fluid circuit 10.

The system 2 may be arranged to heat a number of rooms/spaces. As such, an air handling unit 48 may be provided for each room (or at least a plurality of air handling units may be provided). In some embodiments, the second fluid circuit 12 may comprise a plurality of any one or more of the following: evaporator, compressor, condenser; that is a separate second fluid circuit may be provided for each room to be heated. In other embodiments, the same second fluid circuit may pass through each room to be heated and have a plurality of air handling units therein.

Also, the skilled person will appreciate that the temperature of the inside space 4 and of the outside 6 will affect that amount of heat that can be sourced/sunk thereto since a temperature difference is needed for heat exchange to occur as required by the second law of thermodynamics.

The use of the inside space 4 is also likely to affect the desired temperature of that space. For example, if the space were a swimming pool environment then it is not unusual for the desired air temperature to be 29° C. whereas if the environment were a gymnasium then the temperature may be 18° C. and if the environment were an office or a home the temperature may be closer to 21° C.

In this regard, the system controller 40 is programmed to monitor the inputs thereto and to control the fluid parameters described above to operate the system 2.

The system controller 40 also receives input data from an outside temperature sensor 62 which provides the temperature of the outside 6.

In operation, the system controller 40 is arranged to control both the evaporating temperature (ie the temperature at which the fluid in the first fluid circuit 10) evaporates by controlling the evaporating valve 22 and the condensing temperature within the condenser 18 (ie the temperature at which he fluid within the first fluid circuit 10 condenses) by controlling the variable speed pump 60.

The system controller 40 is arranged to monitor the temperature within the inside space 4 and control the temperature at which the fluid in the first fluid circuit 10 condenses within the condenser 18 (the condensing temperature) to be a predetermined amount above the desired temperature to which the inside space should be controlled. The condensing temperature is controlled by controlling the rate at which fluid is driven around the second fluid circuit 12 by means of a variable speed drive in pump 60.

The predetermined amount of temperature difference accounts for the imperfect heat transfer that occurs within the heat exchanger 42 and the air handling unit 48. That is, the predetermined temperature difference accounts for fabric losses, the sub-cooling required, the minimum sustainable difference between the low temperature hot water leaving the condenser and the required temperature for air leaving the air handling unit 48.

Should the inside space comprise a plurality of zones, rooms or the like, then the system controller 40 is arranged to set the condensing temperature according to the highest temperature requested in any of the zones, rooms.

The system controller 40 is also arranged to control the evaporating temperature (ie the temperature at which the fluid within the first fluid circuit evaporates within the evaporator 24) by controlling the evaporating valve 22. The evaporating temperature is set by subtracting from the outside temperature the sum of the super heat and the minimum sustainable difference between the ambient air temperature and the temperature of the gas leaving the evaporator 24.

Thus, the embodiment being described controls the evaporating and condensing temperatures to minimise the temperature difference between them (ie the system controller 40 controls these temperatures as close as possible to one another noting that a temperature difference is needed due to losses in the heat transfer process). Such an arrangement so raises the Coefficient of Performance (CoP) and improves the energy efficiency of the system.

In use, the system controller 40 of an embodiment of the system is arranged to keep the condensing temperature as low as possible allowing for the need to ensure the complete condensing of the hot gas and the efficiency of heat exchanger 42 such that the flow temperature in the LTHW system 12 is able to meet the heating load set by the air handling unit 48 The desired temperature is set within the system controller 40 by a user of the system.

The system controller 40 is further arranged to keep the evaporating temperature as high as possible consistent with maintaining the extraction of energy from the outside air. In particular, the evaporating temperature is determined by two factors. The first being the outside air temperature as energy can only be extracted from the outside air if the evaporating medium is below the outside air temperature (ie the evaporating temperature is below the outside air temperature). The second being the efficiency of the energy transfer, which is determined by the rate of flow of the refrigerant within the first fluid circuit 10 and the heat transfer capacity. It is also the case that the difference between the evaporating temperature and the outside air temperature must be sufficient to ensure that the liquid refrigerant is sufficiently evaporated to ensure that liquid refrigerant is not carried over into the compressor 16, where it will cause damage. The typical difference can be 5 to 7 degrees C.

Operating the system controller 40 so as to reduce the condensing temperature and to increase the evaporating temperature has the effect of increasing the Coefficient of Performance (COP) which is inversely proportional to the difference between the condensing and evaporating temperatures Indeed, the COP can be improved, perhaps substantially, as the following example illustrates. Assuming an outside temperature, varying between 6 C and 16 C during a given week operating in a swimming pool hall (ie the inside 4) of recent construction, would typically maintain an average evaporating temperature of 5 C and a condensing temperature of 45 C; a difference of 40° C. Without the control system described, the fixed evaporating temperature to meet the range of outside temperature would be 0 C and the fixed condensing temperature would be 50 C; a difference of 50° C.

The skilled person will appreciate that COP is a difference. For instance, in a given air source heat pump system with say, a COP of 4.0, evaporating temperature of 0 C and condensing temperature of 50 C, an increase of evaporating temperature from 0 to 5 C and a decrease of the condensing temperature of 5 C, increases the COP to 5 and the energy efficiency of the system is increased by 25%.

Thus, embodiments of the system that re-calculate and reset the evaporating temperature as outside temperature changes, the COP and energy efficiency of the Air Source Heat Pump can be raised, perhaps substantially, compared to a system in which the evaporating and condensing temperatures are fixed and therefore of necessity have a larger difference.

The difference between the condensing and evaporating temperatures would be 40° C. for the system described and 50° C. for a system with fixed condensing and evaporating temperatures. Because the thermal efficiency of the system is inversely proportional to the difference between the condensing and evaporating temperatures, the system described would be 25% more efficient than the typical system with fixed condensing and evaporating temperatures.

Figure 2:
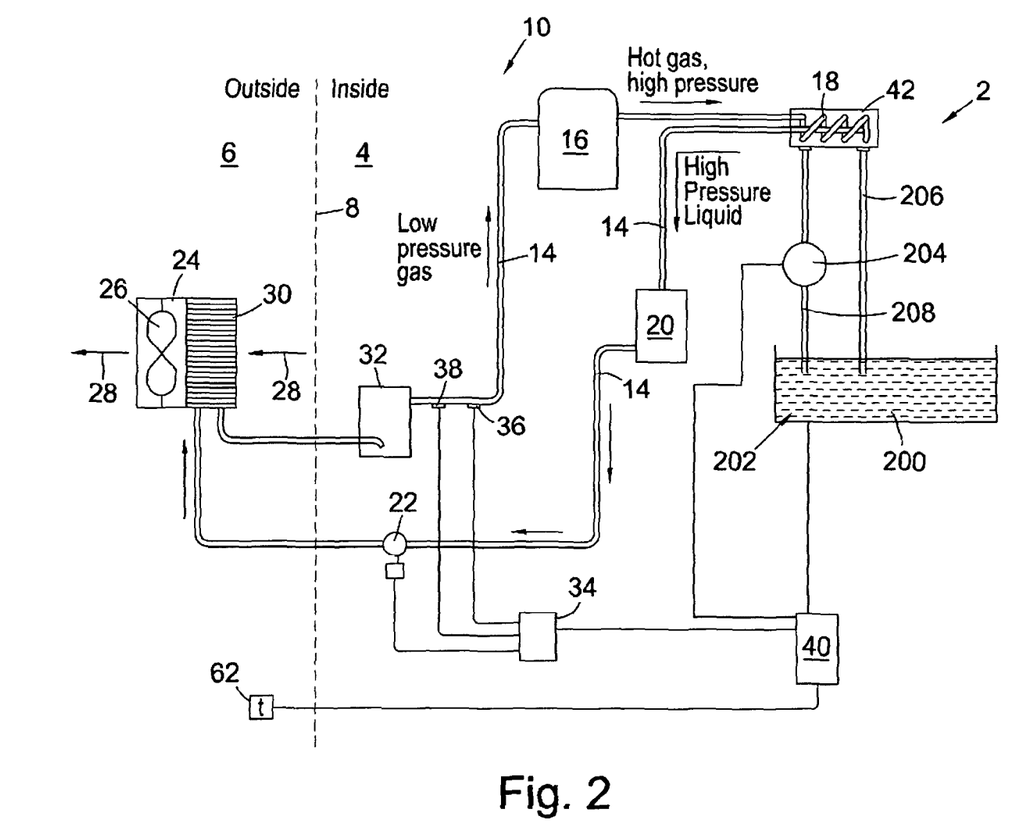
FIG. 2 shows a schematic example of a system according to a further embodiment of the invention being used to heat a swimming pool.

FIG. 2 shows a modification to the system of FIG. 1 but like parts are referred to by like reference numbers. In the embodiment, shown in FIG. 2 a swimming pool 200 and the system 2 is arranged to heat the water within the pool 200.

A temperature sensor 202 is provided to sense the temperature of the water within the pool and provides an input to the system controller 40.

In the embodiment shown, the water within the pool 200 is pumped, using a pump 204, through the heat exchanger 42 to take heat from the first fluid circuit 10; ie from the condenser 18. The system controller 40 is arranged to control the rate at which swimming pool water is pumped through the heat exchanger 42.

In such an embodiment, pipes 206, 208 which convey swimming pool water through the heat exchanger 42 may be thought of a heating pipe work system. As such, the swimming pool water when within the pipes 206, 208 may be thought of as being a medium within the heating pipe work system.

In other embodiments (not illustrated), rather than being pumped directly through the heat exchanger 42, the swimming pool water may be passed through a further heat exchanger so that the second fluid circuit is a closed circuit in which two heat exchangers are provided: a first of which is the heat exchanger 42 and the second of which is a heat exchanger passing heat to the swimming pool water.

In some embodiments, the first fluid circuit controller 34 may be subsumed into the system controller 40.

Moreover, the skilled person will appreciate that elements of this invention may be provided in software, firmware or hardware.

Figure 3:
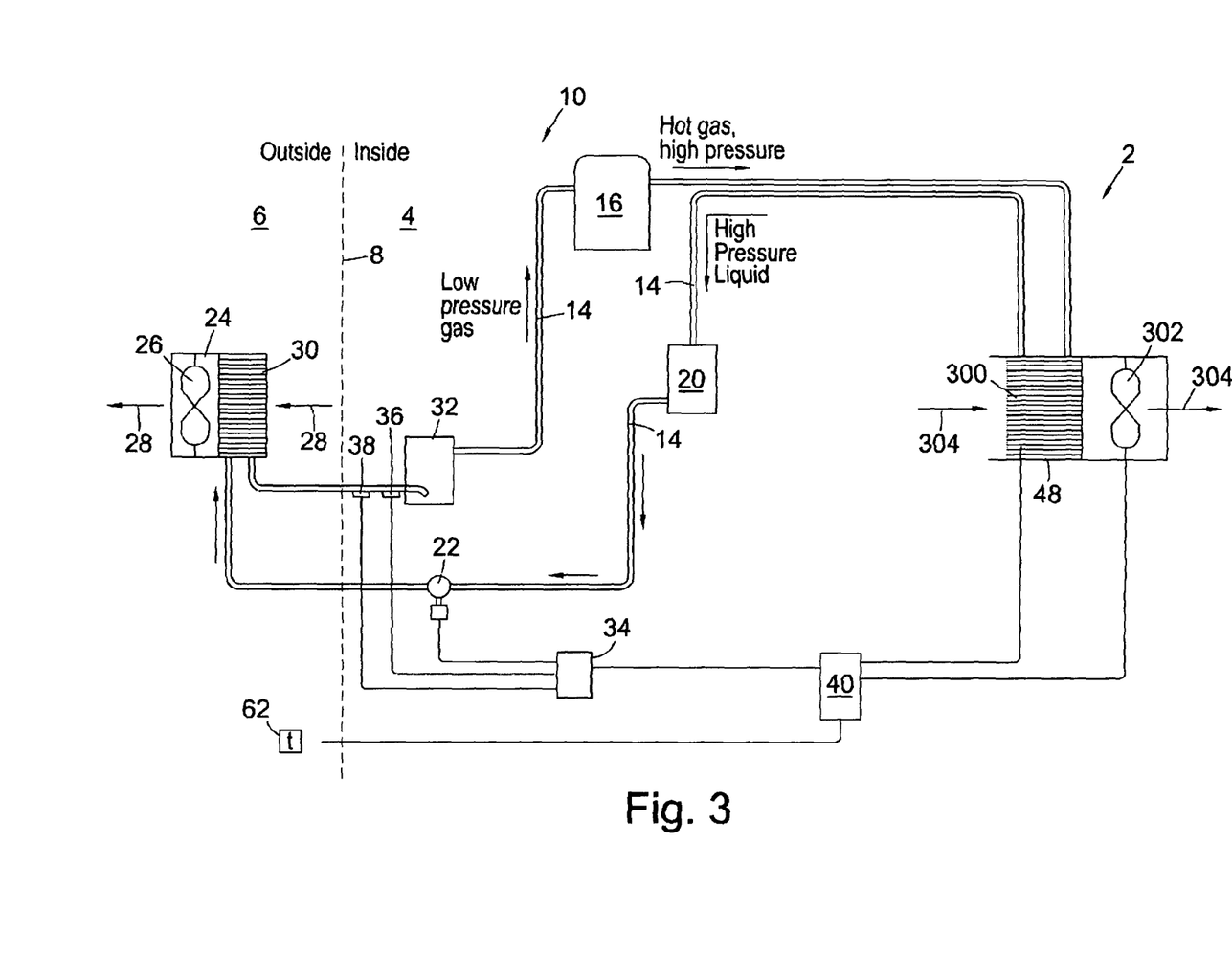
FIG. 3 shows a schematic example of a further embodiment of the invention.

FIG. 3 shows a further embodiment of the invention in which the heat pipe work system (ie the second fluid circuit 12) of the embodiments shown in FIGS. 1 and 2 has been omitted. Otherwise same parts have been referred to with the same reference numbers.

In this embodiment, the refrigerant pipe work system 14 (ie first fluid circuit) comprises a heat exchanger 300 which is arranged to move heat from the cooling fluid within the first fluid circuit to the environment which the system is arranged to heat and/or cool.

A fan 302 is provided which draws air 304 through the heat exchanger 300 thereby moving heat from the fluid within the refrigerant pipe work system 14 to the environment; typically the inside of a room being heated or cooled.

It should also be noticed that, in the embodiment shown in FIG. 3, the temperature sensor 36 and the pressure sensor 38 are provided within the refrigerant pipe work system 14 on the other side of the accumulator 32 when compared to the embodiments shown in FIGS. 1 and 2. The skilled person will appreciate that temperature and pressure sensors can be provided in the arrangement of either (or indeed both) FIGS. 1 and 2, or FIG. 3.

In each of the embodiments above, it will be possible for a plurality of compressors 16 and/or heat exchangers 300, 54 to be provided within the first fluid circuit 10 such that a plurality of environments may be heated and/or cooled. For example, a heat exchanger 54, 300 may be provided for each room that is being heated/cooled.

The invention claimed is:

1. A heating and/or cooling system for maintaining an environment at a desired temperature, comprising:
   a heat pump, comprising;
      a refrigerant pipe system;
      an evaporator connected to the refrigerant pipe system, the evaporator configured to extract heat from a first environment;
      a compressor connected to the refrigerant pipe system;
      a condenser connected to the refrigerant pipe system; and
      an evaporating valve connected to the refrigerant pipe system;
   a temperature sensor disposed to measure a temperature of the first environment; and
   a system controller configured to perform at least one of:
      i) controlling, based on the measured temperature, a condensing temperature within the condenser such that the condensing temperature is set as low as possible while maintaining the condensing temperature a predetermined amount above the desired temperature that is being maintained; and
      ii) controlling the evaporating valve in order to vary, based on the measured temperature, an evaporating temperature in order to reduce the difference between, the evaporating and condensing temperatures.

2. The heating and/or cooling system system according to claim 1, wherein the heat pump is an air source heat pump, wherein the first environment is an outside environment, and wherein the evaporator is configured to extract heat from the outside air.

3. The heating and/or cooling system system according to claim 2, wherein the temperature sensor is disposed to measure an outside air temperature.

4. The heating and/or cooling system system according to claim 3, wherein the system controller is configured to vary the evaporating temperature as a function of the measured temperature.

5. The heating and/or cooling system system according to claim 4, wherein the system controller is configured to periodically and simultaneously vary the evaporating and the condensing temperatures.

6. The heating and/or cooling system system according to claim 1, wherein the condenser comprises a heat exchanger configured to extract heat from a refrigerant within the refrigerant pipe system.

7. The heating and/or cooling system system according to claim 6, further comprising:
   a heating pipe system configured to circulate a medium through the condenser of the refrigerant pipe system thereby exchanging heat between a refrigerant within the refrigerant pipe system and the medium within the heating pipe system.

8. The heating and/or cooling system system according to claim 7, further comprising:
   a pump configured to pump the medium within the heating pipe system around the heating pipe system.

9. The heating and/or cooling system system according to claim 8, wherein the pump is of variable speed.

10. The heating and/or cooling system system according to claim 7, wherein the system controller is configured to control the condensing temperature by varying, based on the measured temperature, the rate of flow of the medium through the condenser.

11. The heating and/or cooling system system according to claim 7, wherein the heat exchanger is configured to transfer heat to the medium within the heating pipe system.

12. The heating and/or cooling system system according to claim 11, wherein the heat exchanger is configured to transfer heat from the medium within the heating pipe system to a second environment.

13. The heating and/or cooling system according to claim 12, wherein the second environment-is an interior of a building or water within a swimming pool.

14. The heating and/or cooling system system according to claim 12, further comprising:
   a by-pass pipe that allows the medium within the heating pipe system to by-pass the heat exchanger of the heating pipe system.

15. The heating and/or cooling system system according to claim 14, further comprising:
   a valve configured to control the amount of the medium within the heating pipe system allowed to flow through the by-pass pipe.

16. A method of heating and/or cooling an environment to a desired temperature, comprising the steps of:
   extracting heat from a first environment, via a heat pump, wherein the heat pump comprises:
      a refrigerant pipe system;
      an evaporator connected to the refrigerant pipe system;
      a compressor connected to the refrigerant pipe system;
      a condenser connected to the refrigerant pipe system; and
      an evaporating valve connected to the refrigerant pipe system; and
   measuring, via a temperature sensor, a temperature of the first environment; and
   performing, via a system controller, at least one of the following steps:
      i) controlling, based on the measured temperature, a condensing temperature within the condenser such that the condensing temperature is set as low as possible while maintaining the condensing temperature a predetermined amount above the desired temperature that is being maintained; and
      ii) controlling the evaporating valve in order to vary, based on the measured temperature, an evaporating temperature in order to reduce the difference between the evaporating and condensing temperatures.

17. The method according to claim 16, wherein the first environment is a building or a swimming pool.

* * * * *